United States Patent [19]

Bhandari et al.

[11] Patent Number: 5,895,464

[45] Date of Patent: Apr. 20, 1999

[54] COMPUTER PROGRAM PRODUCT AND A METHOD FOR USING NATURAL LANGUAGE FOR THE DESCRIPTION, SEARCH AND RETRIEVAL OF MULTI-MEDIA OBJECTS

[75] Inventors: Archna Bhandari, Pittsford; Mary E. Janiszewski, Webster; Rajiv Mehrotra, Rochester, all of N.Y.

[73] Assignee: Eastman Kodak Company, Rochester, N.Y.

[21] Appl. No.: 08/848,207

[22] Filed: Apr. 30, 1997

[51] Int. Cl.[6] .................................................. G06F 17/30
[52] U.S. Cl. ........................................ 707/3; 707/4; 707/5
[58] Field of Search .................................. 707/3, 1, 2, 4, 707/5

[56] References Cited

U.S. PATENT DOCUMENTS

| | | | |
|---|---|---|---|
| 4,914,590 | 4/1990 | Loatman et al. | 364/419 |
| 5,197,005 | 3/1993 | Shwartz et al. | 364/419 |
| 5,265,065 | 11/1993 | Turtle | 707/3 |
| 5,386,556 | 1/1995 | Hedin et al. | 707/100 |
| 5,418,948 | 5/1995 | Turtle | 707/3 |
| 5,434,777 | 7/1995 | Luciw | 364/419.13 |
| 5,488,725 | 1/1996 | Turtle et al. | 707/3 |
| 5,493,677 | 2/1996 | Balogh et al. | 707/3 |
| 5,528,491 | 6/1996 | Kuno et al. | 364/419.08 |
| 5,625,814 | 4/1997 | Luciw | 707/5 |

*Primary Examiner*—Thomas G. Black
*Assistant Examiner*—Frantz Coby
*Attorney, Agent, or Firm*—Peyton C. Watkins

[57] ABSTRACT

A method for using natural language for the description, search and retrieval of multi-media objects, this method comprises receiving a query for the database using natural language; recognizing the syntactic and semantic structure of the query; assigning a role representation of the query for permitting searching an archival database for a query response.

24 Claims, 6 Drawing Sheets

COMPUTER PROGRAM PRODUCT AND A METHOD FOR USING NATURAL LANGUAGE FOR THE DESCRIPTION, SEARCH AND RETRIEVAL OF MULTI-MEDIA OBJECTS

FIELD OF THE INVENTION

The invention relates generally to the field of archival and retrieval of multi-media objects such as still images, audios, videos, graphics, computer generated graphics, drawings and the like and specifically, to archiving and retrieving multi-media objects using a natural language, such as English.

Multi-media objects carry a great deal of information and as multi-media technology is growing, there has been an increasing demand for a system that allows user to easily describe, archive, search and retrieve these multi-media objects. Some conventional methods and their limitations are described as follows.

In the past, people have used shoe boxes and albums to archive their images and then search and retrieval of these images is performed based on user's memory. Stock agencies have used index cards to keep track of stock images and search and retrieval is done using personnel experiences and preferences. Such methods of archiving and retrieving images are difficult, time-consuming and expensive. These methods can also produce imperfect results since these methods are subjective in nature.

As computers became popular and more and more images were stored on-line, keyword based approach was developed. Keyword representations can be created either manually or automatically. In the manual approach, a set of keywords are assigned to each image in the database. The keywords describe the image content of interest (i.e. objects, events, concepts, place, activities, etc.) The KODAK PICTURE EXCHANGE (KPX) uses this approach. A shortcoming of this approach is that a multi-media object, in this instance images, can not always be described by a disjoint set of keywords, image retrieval depends on an exact match of a keyword used in the description and in the search, and the keywords used to describe/retrieve an image may change from user to user. Some incremental improvements can be made to this method by use of a thesaurus.

In the automatic approach, keywords are selected from within the document itself based on statistics pertaining to the relative frequency of word occurrence. This approach is more suitable for document retrieval applications where the large amount of text is available to obtain accurate statistics, such as in the area of newspaper article retrieval. Many text retrieval engines have been developed using this approach. However, in the case of images, the caption will typically be a sentence or two, not enough to extract meaningful statistics from. Another limitation of the keyword based technique for image retrieval is that only the words, and not their meaning or context is taken into account. This makes this technique unsuitable for applications that contain sparse amount of text to describe an image.

Images can also be searched and retrieved using Image Content Analysis techniques. Image content attributes are defined using color, texture, shape etc. Some of the existing systems that perform image content analysis are QBIC from IBM, Virage from Virage. The drawback of this approach is it only allows for image similarity type search and retrieval, that is responding to queries of the form "Find me images like this one . . . ".

University of Buffalo has developed a system called PICTION which uses natural language captions to label human faces in an accompanying newspaper photograph. A key component of the system is the utilization of spatial and characteristic constraints (derived from caption) in labeling face candidates (generated by a face locator). The system is limited to only identifying faces based upon the spatial constraints defined in the caption, for example "John Doe is to the left of Jane Doe . . . ".

Anil Chakravarthy at MIT has developed a program as part of his thesis "Information Access and Retrieval with Semantic Background Knowledge" for retrieving captions of pictures and video clips using natural language queries.

He presents a limited framework for structured representation through the incorporation of semantic knowledge. However, the program only accepts images accompanied by well formed single sentence description. Queries also need to be well formed single sentence description.

U.S. Pat. No. 5,493,677 discloses a natural language archival and retrieval system for images. This patent discloses inputting a search query in a natural language and then searching for archived images. It identifies name, location and noun phrases from the query. Other words are eliminated. For example, prepositions are not used for further processing. This eliminates the context of some sentences and may give inaccurate results during retrieval, for example, the difference between the two phrases, "A man on a horse." and "A man and a horse." In addition, when inputting information that is to be associated with an image into the database, it has to be specified in a standardized form. The user is involved for part-of-speech disambiguation and word-sense disambiguation. This is time consuming and labor intensive.

Consequently, a need exist for a smart archival and retrieval system to eliminate the above-described drawbacks.

SUMMARY OF THE INVENTION

The present invention is directed to overcoming one or more of the problems set forth above. Briefly summarized, according to one aspect of the present invention, the invention is directed to a computer program product for retrieving a multi-media object, comprising computer readable storage medium having a computer program stored thereon for performing the steps of: (a) receiving a query for the database using natural language; (b) recognizing the syntactic and semantic structure of the query; (c) based on step (b), assigning a role representation of the query for permitting searching an archival database for a query response.

It is an object of the present invention to provide a "smart" archival and retrieval system so that syntactic and semantic formalities in the search query are recognized and utilized.

It is a further object of the present invention to provide an efficient and user-friendly means for inputting information into the database, requiring minimal interaction from the user.

It is a feature of the present invention to assign a role representation of the query for permitting searching an archival database for a query response.

It is an advantage of the present invention to provide means for archival and retrieval of images that is free of grammar restrictions.

The above and other objects of the present invention will become more apparent when taken in conjunction with the following description and drawings wherein identical reference numerals have been used, where possible, to designate identical elements that are common to the figures.

DETAILED DESCRIPTION OF THE INVENTION

In the following description, the present invention will be described in the preferred embodiment as a software program. Those skilled in the art will readily recognize that the equivalent of such software may also be constructed in hardware. The preferred embodiment may be utilized for any multi-media object but the preferred embodiment is illustrated using images.

The preferred embodiment uses text input for the natural language. It is instructive to note that speech input or input from a communication or a multi-media capture storage device could also be used, for example an image/video camera and video phone.

Still further, as used herein, computer readable storage medium may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

The below-described invention is illustrated using the English language as the preferred natural language. However, the present invention is not limited to the English, but may be used with any other natural language as will be obvious to those skilled in the art.

Figure 1:
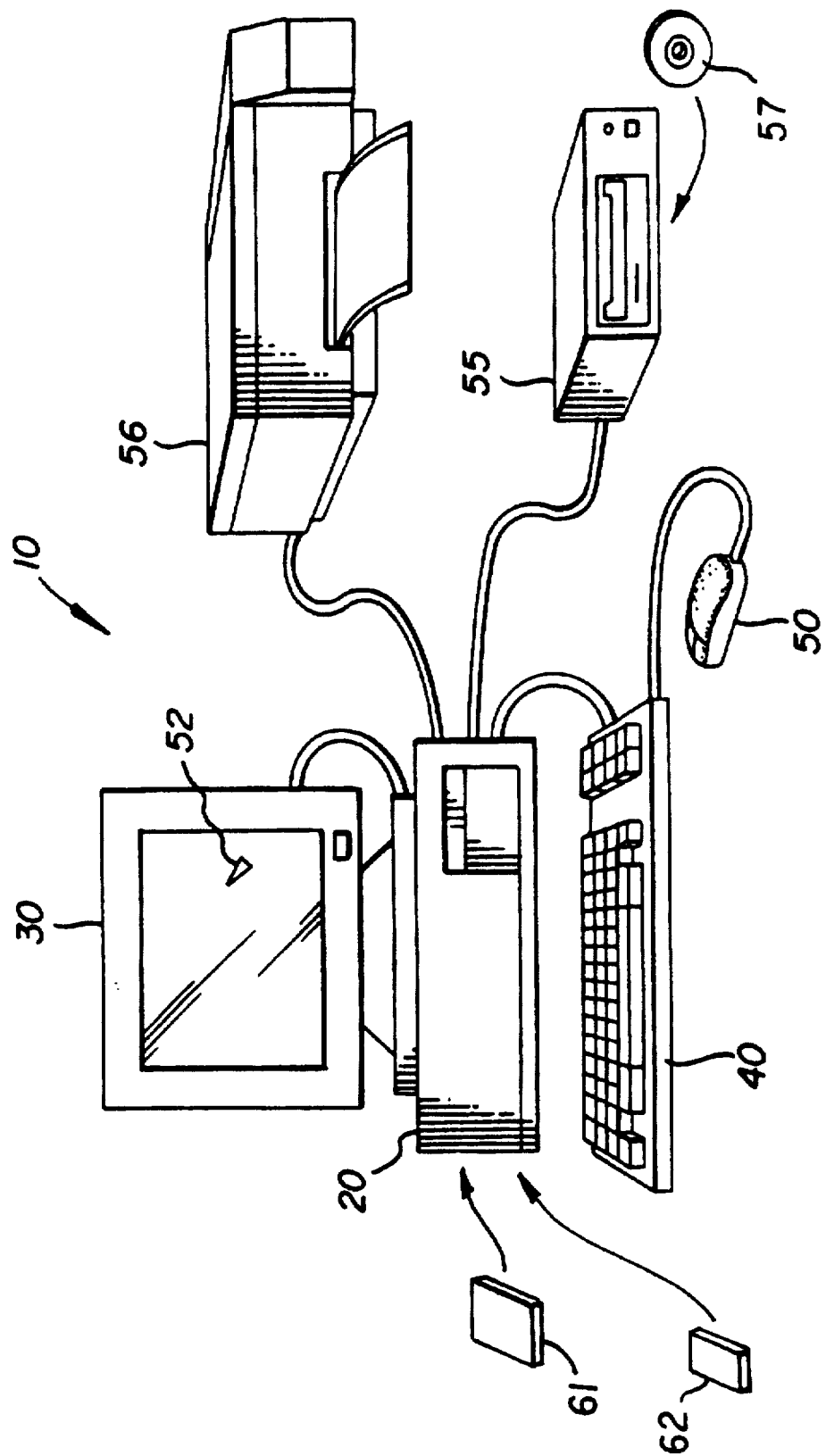
FIG. 1 is a diagram of a computer system on which the present invention may be utilized.

Referring to FIG. 1, there is illustrated a computer system 10 for implementing the present invention. Although the computer system 10 is shown for the purpose of illustrating a preferred embodiment, the present invention is not limited to the computer system 10 shown, but could be a distributed system such as client-server or a web application. Images can be fed directly from a capture device or from the internet or some other live feed. The computer system 10 includes a microprocessor-based unit 20 for receiving and processing software programs and for performing other processing functions. A display 30 is electrically connected to the microprocessor-based unit 20 for displaying user-related information associated with the software. A keyboard 40 is also connected to the microprocessor-based unit 20 for permitting a user to input information to the software. As an alternative to using the keyboard 40 for input, a mouse 50 may be used for moving a selector 52 on the display 30 and for selecting an item on which the selector 52 overlays, as is well known in the art.

A compact disc-read only memory (CD-ROM) 55 is connected to the microprocessor-based unit 20 for receiving software programs and other information, such as images, and for providing a means of inputting them into the microprocessor-based unit 20. A compact disc 57 stores the software and images, and is inserted into the CD-ROM 55 for permitting the CD-ROM 55 to retrieve the images and software. Storage medium is not limited to locally stored objects but could also consist of a file or multimedia object server. Images could also be fed directly to the system through an image capture device, such as a scanner, or a live feed as via the internet. In the case of images, they are displayed on the display 30.

In addition, a floppy disk 61 may also include a software program, and is inserted into the microprocessor-based unit 20 for inputting the software program. Still further, the microprocessor-based unit 20 may be programmed, as is well know in the art, for storing the software program internally. A printer 56 is connected to the microprocessor-based unit 20 for printing a hardcopy of the output of the computer system 10.

Images may also be displayed on the display 30 via a personal computer card (PC card) 62 or, as it was formerly known, a personal computer memory card international association card (PCMCIA card) which contains digitized images electronically embodied in the card 62. The PC card 62 is ultimately inserted into the microprocessor-based unit 20 for permitting visual display of the image on the display 30.

Figure 2:
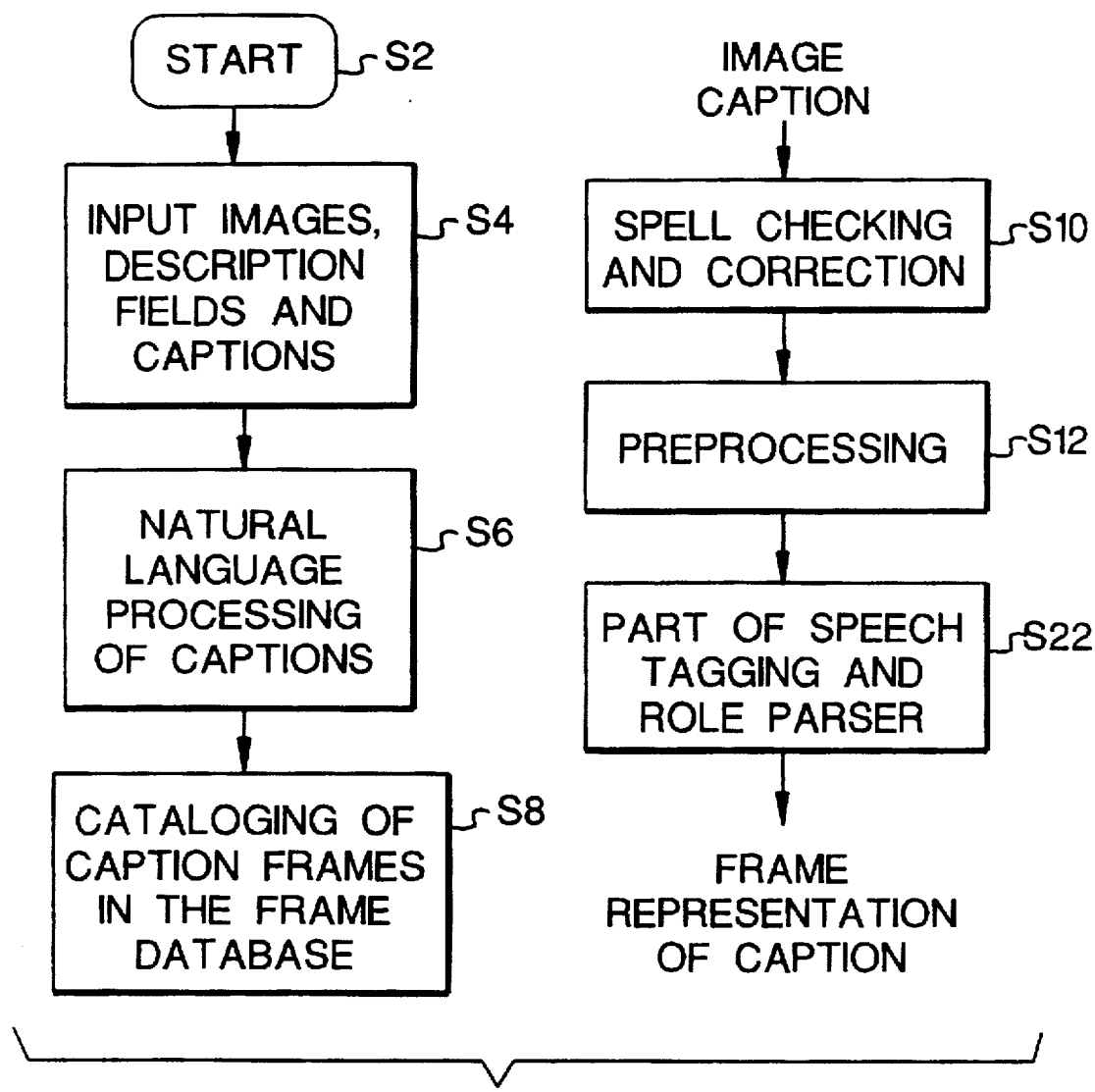
FIG. 2 is a flowchart of the software program of the present invention for inputting data that is to be associated with an image using natural language.

Referring to FIG. 2, there is illustrated a flowchart of a software program of the present invention. The software is initiated S2 and images are input S4 to the microprocessor-based unit 20 from a storage device such as the CD-ROM 57. The user inputs description fields and caption to be associated with a particular image (metadata). The description fields may include but are not limited to, when image was taken, who the photographer was and any application specific information. These description fields will be stored as individual fields. Caption may include one or more natural language phrases or sentences without any grammar restrictions describing any characteristic of the image.

The caption is then processed S6. It takes the caption as an input, performs the natural language processing and outputs the frame representation for the caption. The natural language processing S6 will be described in detail below. The next step is to catalog the caption frames in the frame database S8. Images are stored in the image data base. The image database may be physically the same or different from the frame database. Each frame in the frame database contains corresponding image id from the image database.

Figure 3:
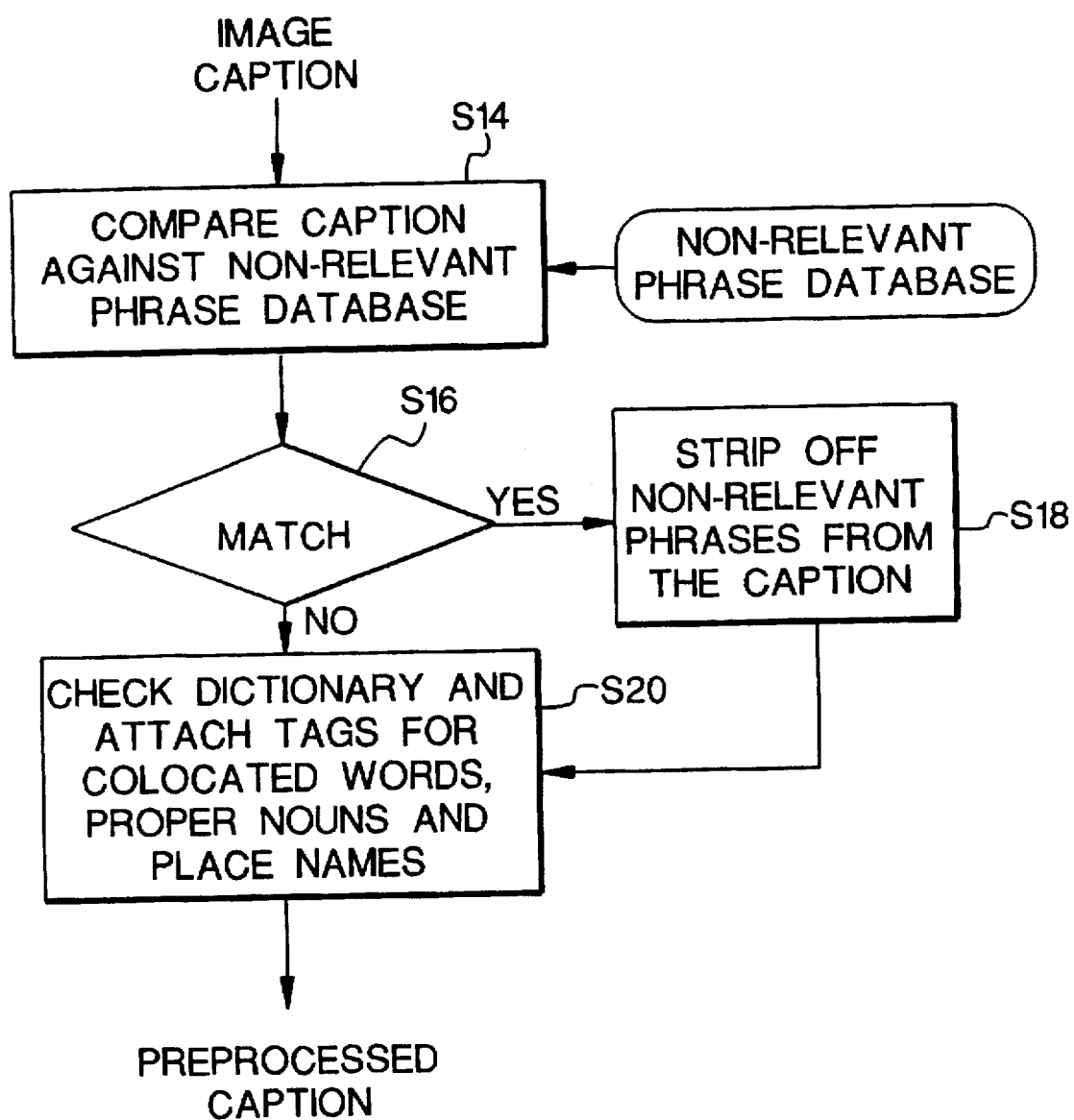
FIG. 3 is a detailed flowchart of a portion of FIG. 2.

The details of the processing step S6 are spell checking of the input caption and correcting any errors found using conventional methods S10. Referring now to FIGS. 2 and 3, next, the input caption is preprocessed S12 which includes comparing the input caption with a non-relevant phrase database S14. Comparison is made using standard string matching techniques. The non-relevant phrase database contains phrases that do not contribute to the meaning of a caption. Those skilled in the art will recognize that there are a plurality of phrases and words which are input for captioning that do not contribute to the meaning.

If a match of a non-relevant phrase is found S16, the phrase is deleted S18; for example, an initial caption of "this is a picture of a black automobile." will have the phrase "This is a picture of" deleted from the caption. The remaining caption, if any non-relevant phrases have been deleted, or the original caption is then searched for any co-located words, that is compound words such as operating room. These are put together as one word, for example operating_room. Then proper nouns and place names are identified and a tag identifying them as such is attached S20.

Figure 4:
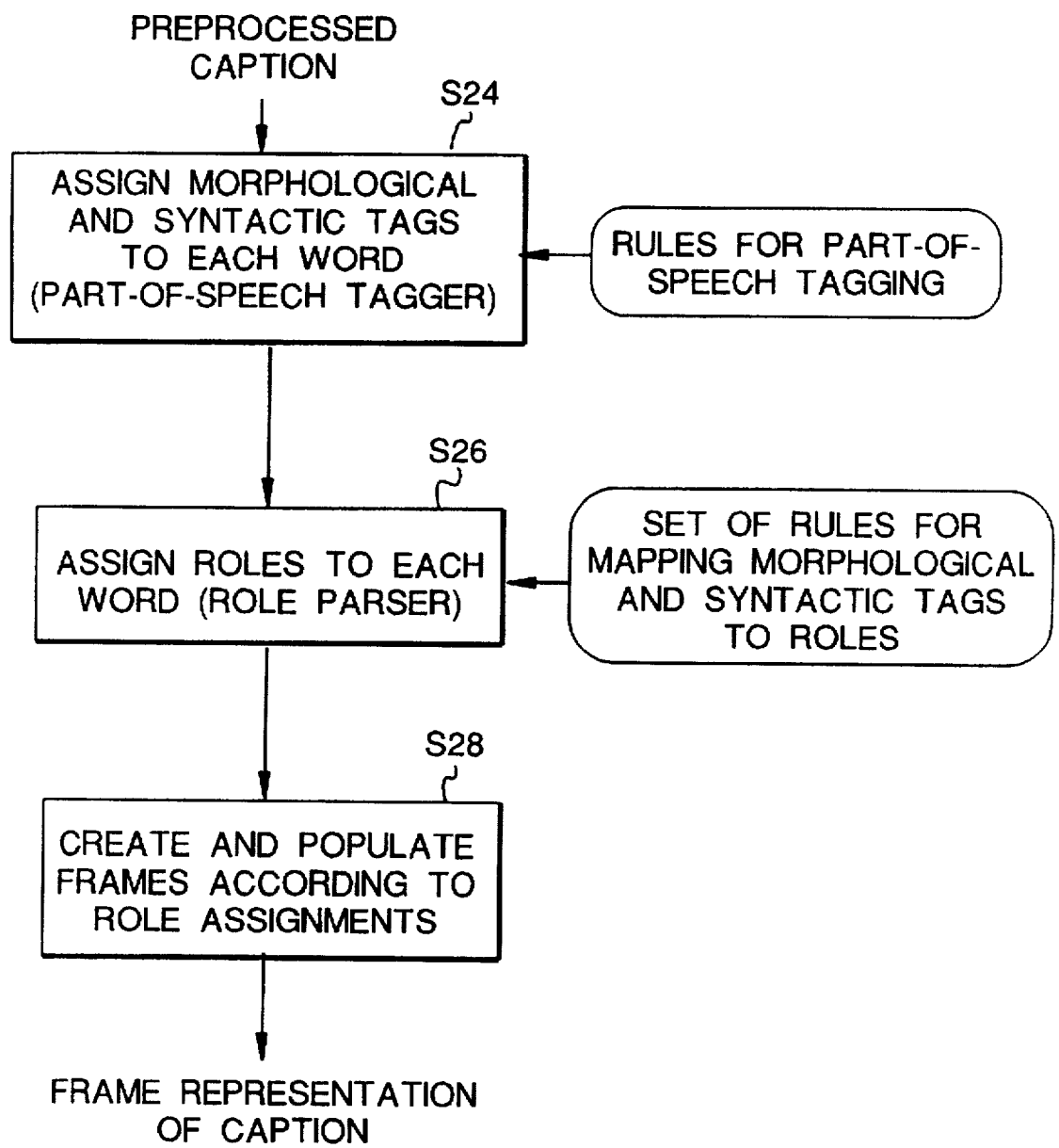
FIG. 4 is also a detailed flowchart of a portion of FIG. 2.

Referring to FIG. 2 and FIG. 4, after preprocessing, the caption is sent through the part-of-speech tagging and Role Parser unit S22. There are several part-of-speech tagging tools available, for example Xerox PARC tagger and MIT media lab tagger. In the preferred embodiment, this invention uses ENGCG part-of-speech tagger from Lingsoft, Inc. ENGCG contains a set of rules related to part-of-speech tagging. It reduces words to their root form and assigns morphological and syntactic tags to each word of the caption, S24. Morphological tags identify nouns, verbs, adjectives, prepositions etc. Syntactic tags identify the function of the word in the sentence, such as subject, main verb, and the like. For example, in the caption "Little girl is standing near an orange car.", the word "orange" gets assigned the morphological tag of an adjective and the syntactic tag of pre-modifying adjective. ENGCG contains about 32 syntactic tags and a long list of morphological tags.

The tagged caption is then sent to the Role Parser unit to assign the roles that different words play S26. The preferred roles are agent, action, patient, location, and prepositional roles, although other roles may be used especially for a different application. In the case of video or audio retrieval, a different set of roles may be more appropriate. The agent role indicates an actor who is performing an action, action role identifies an activity that is being performed, patient identifies an object affected in some way by an action. Some of these roles are similar to case grammar representation first suggested by Fillmore (reference: Fillmore, C. J. 1968. "The Case for Case," in Universals of Linguistic Theory, edited by E. Bach and R. T. Harms, Holt, New York.)

Case grammar claims that there is a small fixed number of ways in which verbs can be used in a sentence. These describe the basic ways that a noun phrase or a prepositional phrase relates to the verb. All verbs must select their cases from this set. For example, possible cases for the verb "fly" could be agent, patient, source and destination. In the sentence, "Jack is flying a plane from New York to Boston", fly is the identified verb, Jack is an agent, plane is the patient, source is New York and the destination is Boston. However, the limitation of Case grammar approach is that it works only with well formed (enforced grammar rules) single sentences and the possible cases for each verb has to be predefined. In this preferred embodiment, these restrictions are removed and roles are generated dynamically based upon the caption description.

The Role parser contains rules to map syntactic and morphological tags to the actual roles that the words play S26. Attributes for each role are also identified. For example, in the caption, "a black automobile", "black" becomes a pre-modifying adjective or attribute for the "automobile." In another example, "Skier skiing downhill.", "downhill" becomes a post modifying attribute for "ski." In this preferred embodiment, a matrix was created based upon syntactic and morphological tags available from the ENGCG part-of-speech tagger to identify possible role assignments, pre-modifying attribute tags and post-modifying attribute tags for the agent, action, patient, preposition, and location roles. Some of these tags can belong to multiple categories. For example, syntactic tag of generated by the ENGCG tagger "@NN>"could be an agent or an attribute of an agent based upon its context in the sentence.

This matrix was translated into a set of rules for determining roles and attributes. It also included rules for ignoring tags of determiners like "a" "an" "the" and the main verb "be" which are not used for determining roles. Role parser, S26 analyzes each tagged word in the caption. If the combination of syntactic and morphological tags identifies that word to be ignored then it goes to the next word. Each word is analyzed based on the rules and identified either as an attribute tag or a role tag. It collects a list of attributes along with their values until a role is identified. Once a role is identified, an attribute list is assigned to that role and the remaining caption is searched for any post modifying attributes. If any post modifying attributes are present, they are also stored with the currently identified role. This process is repeated until each word of the caption is analyzed. For example, a caption "The flower garden is in full bloom." will result in "garden" as the agent role, "flower" as an attribute for the agent role, "in" as a preposition role containing "bloom" as its value and "full" as an attribute for "bloom". The location role is assigned to any place names that were identified in the preprocessing, S12.

After the roles and attributes for all the words have been determined, a frame is created and populated. The roles are collectively referred to hereinafter as a frame. A frame, in general, is a cluster of facts that describe a typical situation, which in this application is the description of an image. The frame structure representation is created and populated S28 based on the roles identified. Each frame will have a unique identifier along with a list of roles. Each role will have a value and a list of attributes. In the case of plurality of roles, a list of roles will be included in the frame. For example, a caption "The flower garden is in full bloom." after role assignment, S26 will result into a frame depicted below—

| frame (pId1: | | |
|---|---|---|
| | (agent: | (value: (garden), attribute: (flower)) |
| | (in: | (value: (bloom), attribute: (full))) |
| | (imageid: | p1)) | where p1d1 is the frame identifier for this caption representation, the roles are agent and in and p1 is the corresponding image id in the image database. In the case of multiple roles, a list of role values would be included here.

Figure 5:
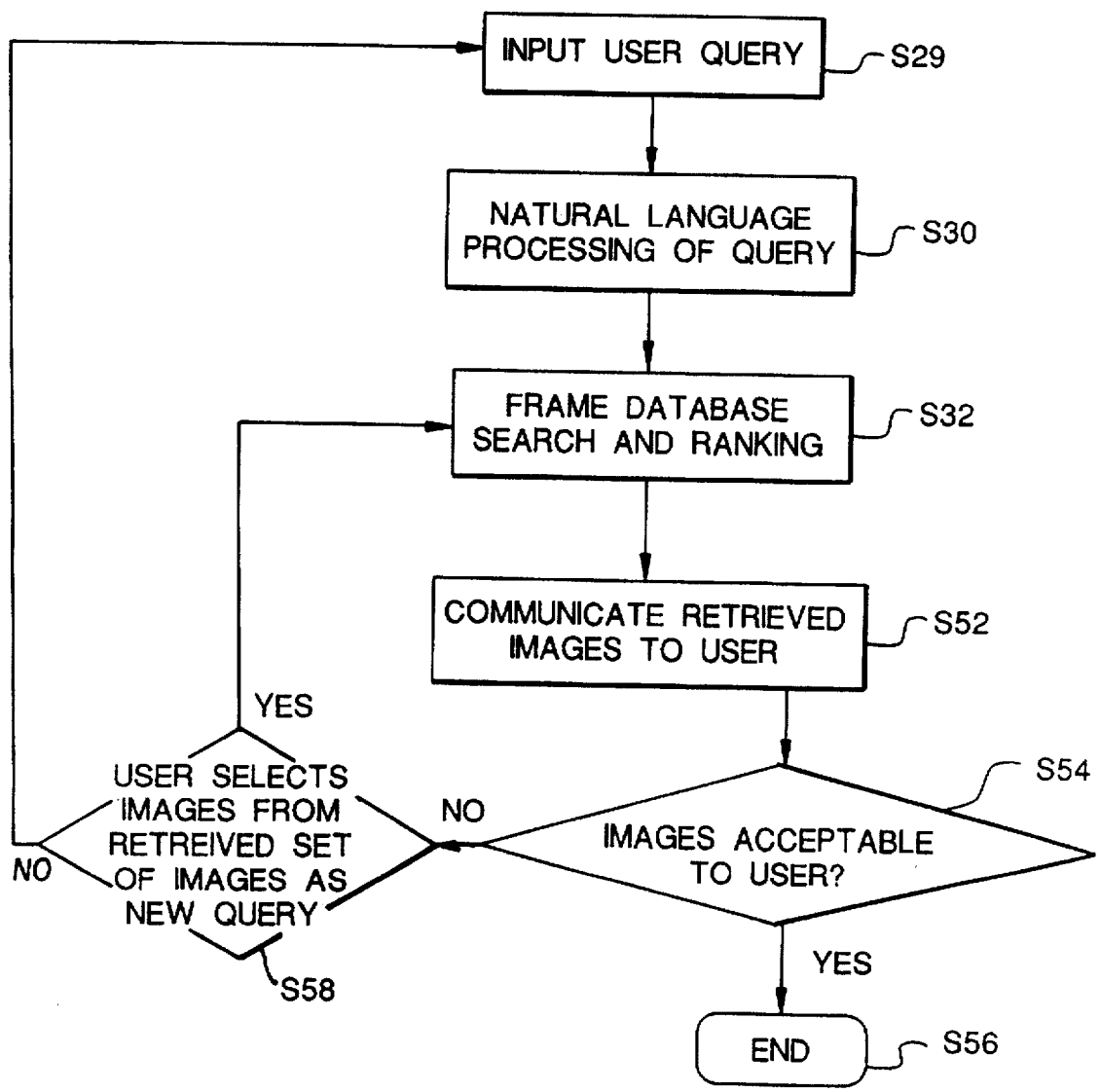
FIG. 5 is a flowchart of the software program of the present invention for querying the database for searching and retrieving one or more desired images using natural language.

The frame database populated with the frames described above S8. Now the frame database may be queried for finding an image having characteristics desired by the user. Referring now to FIG. 5, the user inputs a natural language query S29 which is processed S30 using the same method as described above in reference to step S6. Briefly described, these steps include spell checking, preprocessing, part-of-speech tagging, assigning roles and populating a frame. Next, the frame representation of the query is searched for matching frames in the frame database. If any matches are found, they are ranked in order of significance S32. Any fielded information which has been entered along with query, will be searched against the caption description fields using standard database search techniques.

Figure 6:
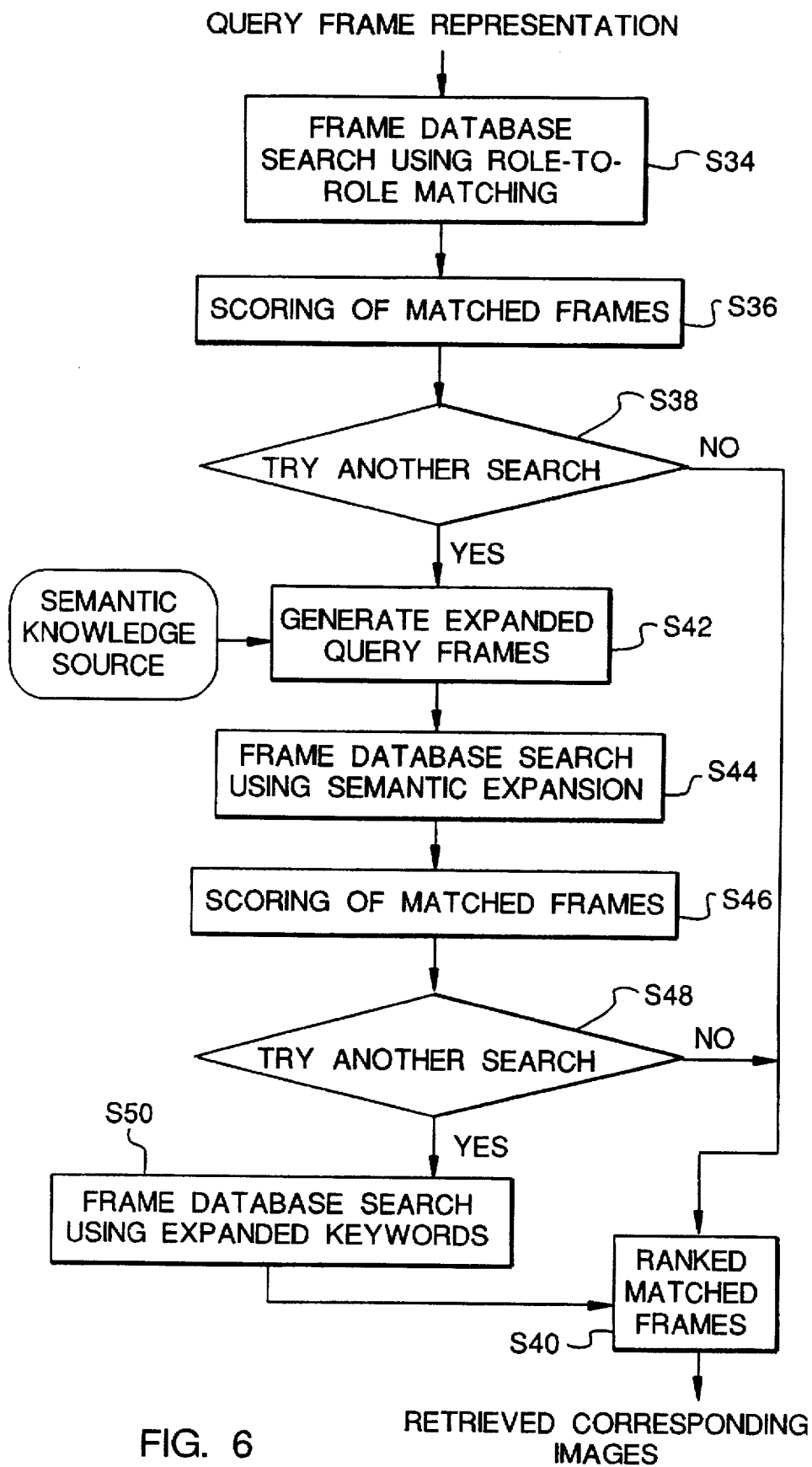
FIG. 6 is a detailed flowchart of a portion of FIG. 5.

Referring to FIG. 6, step S32 is described in detail. The frame representation of the query is first matched role-to-role S34 with the caption frames in the frame database, that is the agent role of query frame is matched against the agent role of caption frames, action role of query frame is matched against the action role of caption frames and so on. A set of rules are created to govern the matching and every matching rule has an associated weight, as can be determined by those skilled in the art. The matching results are scored based on the number of role matches and their associated weights. In the preferred embodiment, the weights in descending order of weighting are the agent, the action, the location, the patient and the prepositional phrases. The weighting scheme may vary according to the application. The total weight is calculated by summing the individual weights contributed by each query role. The number and score of matched frames S36, is analyzed against a predefined threshold, as can be determined by those skilled in the art, which determines whether the set of matches is acceptable.

If the retrieved matches are not acceptable S38, system performs the next level search S42. Optionally, the user may make the decision to continue to search further or not. If the next level search is not required, corresponding images are retrieved from the image database based on the image id's stored in the caption frames and displayed in the order of the ranking S40.

If the next level search is required S42, an expanded query frame is generated. Query frame expansion is done by looking up the query role words in the semantic knowledge source and adding a set of appropriate words based on the relationships. In the preferred embodiment, WordNet, which was developed at Princeton University, is be used for semantic knowledge source. WordNet is an on-line dictionary of nouns, verbs, adjectives and adverbs which are organized into synonym sets. Different relationships link the synonym sets together. Synonym sets are also organized into different senses of words. In this application, the most common senses of words will be used.

The most important relationship utilized in this preferred embodiment is the synonym. For the Agent role, query words are first augmented by adding synonyms. For example, if the Agent role word was "child", then the synonyms of "kid", "youngster" and so on, would also be used in the matching. Generalization or the a-kind-of (hypernym) relationship is also used. For the action role, in addition to synonyms, the cause and entail relationships is used. This expanded query is then searched against the caption frame database S44. Matching is still of type role-to-role matching, as described above S34. The results of the search are scored S46 and ranked in the same manner as described above S36. If retrieved matches are not acceptable S48 based on the predefined threshold, the next level of search is performed S50. Optionally, user may make the decision to continue further search or not. If the next level search is not required, corresponding images are retrieved from the image database in the order of the ranking S40.

If the next level search is required, the frame database search using expanded keywords is performed S50. It consists of matching any expanded query role to any caption role in the caption frame database. This search is performed without regard to the role the words play in the sentence. This is analogous to a keyword match using the expanded query words.

Referring back to FIG. 5, the images and associated captions are retrieved S52 in their order of ranking and are displayed on the display 30 in a suitable manner, preferably thumbnails, for permitting the user to view the images. If any one or all of the images are acceptable S54, the selected images may be printed, ordered, transmitted over network, stored in an album or further manipulated before exiting out S56.

If the retrieved images are not acceptable to the user, the user may input another natural language query S29 or select one or more images from the retrieved set of images as new query S58. If an image from the retrieved set of images is selected as the new query, the corresponding frame representation will become the new query frame and frame database search and ranking step, S32 will proceed. In case of multiple selected images, either union or intersection of the corresponding retrieved images sets can be selected to satisfy the query. This can be chosen by the user or setup by the system.

The invention has been described with reference to a preferred embodiment. However, it will be appreciated that variations and modifications can be effected by a person of ordinary skill in the art without departing from the scope of the invention.

Parts List:
10 computer system
20 microprocessor-based unit
30 display
40 keyboard
50 mouse
52 selector
55 CD-ROM
56 printer
57 compact disc
61 floppy diskette
62 PC card

We claim:

1. A computer program product for retrieving a multi-media object, comprising:
a computer readable storage medium having a computer program stored thereon for performing the steps of:
(a) receiving a query composed in natural language for searching a database;
(b) recognizing syntactic and semantic structure of the query;
(c) based on step (b), assigning a role representation to the query, which said role representation further comprises assigning agent role that indicates an actor role who is performing an action, an action role that identifies an activity that is being performed, and a patient role that identifies an object affected in some way by the action, for permitting the search of the multimedia object database to generate a query response.

2. The computer program product as in claim 1, wherein step (b) includes recognizing word or phrases that do not contribute to the meaning of the query.

3. The computer program product as in claim 1 further comprising assigning either a location role that identifies any place name; a prepositional role; or an agent attribute role, patent attribute role, action attribute role or location attribute role.

4. The computer program product as in claim 1, wherein step (b) includes using prepositional phrases to enhance the query representation.

5. A computer program product for archiving both a multi-media object and an associated description composed in a natural language, comprising:
a computer readable storage medium having a computer program stored thereon for performing the steps of:
(a) receiving the description composed in natural language to be associated with the multi-media object;
(b) recognizing the syntactic and semantic structure of the of the description;
(c) based on step (b), assigning a role representation of the description, which said role representation further comprises assigning agent role that indicates an actor who is performing an action, an action role that identifies an activity that is being performed, and a patient role that identifies an object affected in some way by the action, for storage in an archival database.

6. The computer program product as in claim 5, wherein step (b) includes recognizing word or phrases that do not contribute to the meaning of the metadata.

7. The computer program product as in claim 5 further comprising assigning either a location role that identifies any place name; a prepositional role; or an agent attribute role, patent attribute role, action attribute role or location attribute role.

8. The computer program product as in claim 5, wherein step (b) includes using prepositional phrases to enhance the metadata representation.

9. A method for retrieving a multi-media object, comprising the steps of:

(a) receiving a query composed in natural language for searching a database;

(b) recognizing syntactic and semantic structure of the query;

(c) based on step (b), assigning a role representation to the query, which said role representation further comprises assigning agent role that indicates an actor role who is performing an action, an action role that identifies an activity that is being performed, and a patient role that identifies an object affected in some way by the action, for permitting the search of the multimedia object database to generate a query response.

10. The method as in claim 9, wherein step (b) includes recognizing word or phrases that do not contribute to the meaning of the query.

11. The method as in claim further comprising assigning either a location role that identifies any place name; a prepositional role; or an agent attribute role, patent attribute role, action attribute role or location attribute role.

12. The method as in claim 9, wherein step (b) includes using prepositional phrases to enhance the query representation.

13. A method for archiving both a multi-media object and a associated description composed in a natural language, comprising the steps of:

(a) receiving the description composed in natural language to be associated with the multi-media object;

(b) recognizing the syntactic and semantic structure of the of the description;

(c) based on step (b), assigning a role representation of the description, which said role representation further comprises assigning agent role that indicates an actor who is performing an action, an action role that identifies an activity that is being performed, and a patient role that identifies an object affected in some way by the action, for storage in an archival database.

14. The method as in claim 13, wherein step (b) includes recognizing word or phrases that do not contribute to the meaning of the metadata.

15. The method as in claim 13 further comprising assigning either a location role that identifies any place name; a prepositional role; or an agent attribute role, patent attribute role, action attribute role or location attribute role.

16. The method as in claim 13, wherein step (b) includes using prepositional phrases to enhance the metadata representation.

17. A computer program product for retrieving a multi-media object, comprising:

a computer readable storage medium having a computer program stored thereon for performing the steps of:

(a) receiving a query composed in natural language for searching a database;

(b) recognizing syntactic and semantic structure of the query;

(c) based on step (b), assigning a role representation to the query, which said role representation further comprises assigning agent that indicates an actor who is performing an action, an action that identifies an activity that is being performed, and a patient that identifies an object affected in some way by the action, for permitting the search of the multimedia object database to generate a query response;

(d) comparing the query roles to an archived multimedia object description roles to identify matching roles; and (e) computing a quality of matched between the query and the archived multimedia object description based on the matching roles.

18. The computer program product as in claim 17, wherein step (b) includes recognizing word or phrases that do not contribute to the meaning of the query.

19. The computer program product as in claim 17 further comprising assigning either a location role that identifies any place name; a prepositional role; or an agent attribute role, patent attribute role, action attribute role or location attribute role.

20. The computer program product as in claim 17, wherein step (b) includes using prepositional phrases to enhance the query representation.

21. A method for retrieving a multi-media object, comprising the steps of:

(a) receiving a query composed in natural language for searching a database;

(b) recognizing syntactic and semantic structure of the query;

(c) based on step (b), assigning a role representation to the query which said role representation further comprises assigning agent role that indicates an actor who is performing an action, an action role that identifies an activity that is being performed, and a patient role that identifies an object affected in some way by the action, for permitting the search of the multimedia object database to generate a query response;

(d) comparing the query roles to an archived multimedia object description roles to identify matching roles; and (e) computing a quality of matched between the query and the archived multimedia object description based on the matching roles.

22. The computer program product as in claim 21, wherein step (b) includes recognizing word or phrases that do not contribute to the meaning of the query.

23. The computer program product as in claim 21 further comprising assigning either a location role that identifies any place name; a prepositional role; or an agent attribute role, patent attribute role, action attribute role or location attribute role.

24. The computer program product as in claim 21, wherein step (b) includes using prepositional phrases to enhance the query representation.

* * * * *